(12) United States Patent
Brostovsky et al.

(10) Patent No.: US 10,191,775 B2
(45) Date of Patent: Jan. 29, 2019

(54) METHOD FOR EXECUTING QUERIES ON DATA CHUNKS USING GRAPHIC PROCESSING UNITS

(71) Applicant: SQREAM TECHNOLOGIES LTD, Tel Aviv (IL)

(72) Inventors: Ori Brostovsky, Karmiel (IL); Omid Vahdaty, Tel Aviv (IL); Eli Klatis, Bat Yam (IL); Tal Zelig, Ramat Gan (IL); Jake Wheat, Ramat Gan (IL); Razi Shoshani, Rehovot (IL)

(73) Assignee: SQREAM TECHNOLOGIES LTD., Tel Aviv (IL)

( * ) Notice: Subject to any disclaimer, the term of this patent is extended or adjusted under 35 U.S.C. 154(b) by 182 days.

(21) Appl. No.: 15/385,003

(22) Filed: Dec. 20, 2016

(65) Prior Publication Data

US 2017/0177412 A1    Jun. 22, 2017

Related U.S. Application Data

(60) Provisional application No. 62/270,031, filed on Dec. 20, 2015.

(51) Int. Cl.
*G06F 9/50* (2006.01)
*G06F 17/30* (2006.01)
(Continued)

(52) U.S. Cl.
CPC .......... *G06F 9/5044* (2013.01); *G06F 9/5016* (2013.01); *G06F 12/0811* (2013.01); *G06F 12/1081* (2013.01); *G06F 17/30132* (2013.01); *G06F 17/30442* (2013.01); *G06F 17/30519* (2013.01); *G06F 12/0873* (2013.01); *G06F 2212/1016* (2013.01); *G06F 2212/283* (2013.01); *G06F 2212/284* (2013.01); *G06F 2212/463* (2013.01); *G06F 2212/502* (2013.01);
(Continued)

(58) Field of Classification Search
None
See application file for complete search history.

(56) References Cited

U.S. PATENT DOCUMENTS 8,244,718 B2 *   8/2012   Chamdani ......... G06F 17/30442
                                                              707/718
9,864,695 B2 *   1/2018   Bakke ................. G06F 12/0868
(Continued)

*Primary Examiner* — Jared I Rutz
*Assistant Examiner* — Marwan Ayash
(74) *Attorney, Agent, or Firm* — Browdy and Neimark, P.L.L.C.

(57) ABSTRACT

The present invention discloses a method for optimizing the throughput of hardware accelerators (HWAs) in a computerized abstraction system, by utilizing the maximal data input bandwidth to the said HWAs.
The method is comprised of the following steps:
dynamically obtaining the quantities and properties of HWAs and storage units within the computerized abstraction system
dynamically allocating cache memory space per each of the HWAs, according to the said obtained quantities and properties, to minimize the time required for reading data from storage instances to the said HWA
dynamically allocating spoolers per each of the HWAs, according to the said obtained quantities and properties, to buffer the input data and ensure a continuous flow of input data, in the target HWA's maximal input bandwidth.

8 Claims, 8 Drawing Sheets

(51) Int. Cl.
*G06F 12/0811* (2016.01)
*G06F 12/1081* (2016.01)
*G06F 3/06* (2006.01)
*G06F 12/08* (2016.01)
G06F 12/0873 (2016.01)

(52) U.S. Cl.
CPC .. *G06F 2212/601* (2013.01); *G06F 2212/656* (2013.01)

(56) References Cited

U.S. PATENT DOCUMENTS

| | | | | |
|---|---|---|---|---|
| 2009/0096481 | A1* | 4/2009 | Butter | G06F 17/5054 326/38 |
| 2012/0047126 | A1* | 2/2012 | Branscome | G06F 17/30519 707/714 |
| 2012/0230341 | A1* | 9/2012 | Mital | G06F 9/3009 370/400 |
| 2013/0117305 | A1* | 5/2013 | Varakin | G06F 9/5072 707/769 |
| 2015/0116340 | A1* | 4/2015 | Nagai | G06F 17/30442 345/531 |
| 2015/0213074 | A1* | 7/2015 | Varakin | G06F 17/30445 707/741 |
| 2015/0242487 | A1* | 8/2015 | Varakin | G06F 17/30442 707/616 |
| 2015/0278294 | A1* | 10/2015 | Varakin | G06F 17/30442 707/693 |

* cited by examiner

| Opaque File System 16 | |
|---|---|
| Following the dynamically changing quantities and properties of Computerized Abstraction System 10 components, e.g.:<br>•Hardware Accelerators (HWAs, 24)<br>•Local Storage 14<br>•Remote Storage units 15, and respective CPUs 19 or other controllers<br>•Hardware accelerator Readers (HWARs, 22)<br>•Network Interconnection Layer (NIL, 20) | 210 |
| Treating all memory media mounting points as one logical scalable partition at the application level. | 220 |
| Implementing preconfigured policy of storage resource redundancy. | 230 |
| According to the dynamically changing quantities and properties of Abstraction System 10 components, dynamically allocating resources to the HWARs 22 to maximize the HWAs' data input rate, and ensure optimal HWA throughput, e.g.:<br>•Number of HWARs<br>•Number of spoolers 26, and their buffer size<br>•Local memory space 14<br>•Access to the Network Interconnection Layer 20 | 240 |
| According to the dynamically changing quantities and properties of Abstraction System 10 components, configuring the Hierarchical Cache Management (HCM, 17) module to implement a cache policy on the HWARs. This policy serves to cache HWA 24 input data in order to minimize data-read time, maximize the HWAs' data input rate, and maintain high HWA 24 throughput.<br>The Hierarchical Cache policy configuration includes:<br>•Allocating HWA Cache 25 memory space<br>•Optionally dividing the cache memory space between a local memory instance and a remote memory instance, thus forming a hierarchical cache scheme. | 250 |
| According to the dynamically changing quantities and properties of Abstraction System 10 components, configuring the Network Interconnection Layer (NIL, 20) module.<br>The NIL 20 module facilitates direct access of any of the HWARs 22 to designated storage media. | 260 |

Figure 2

Hardware Accelerator Readers (HWAR) module 22

Receiving, and buffering chunks of data from local storage 14 and remote storage 15 modules, en route the HWA module. It buffers the said data chunks on spoolers 26.  410

Receiving, and buffering chunks of data over the Network Interconnection Layer 20, en route the HWA module. It buffers the said data chunks on spoolers 26.  420

Buffering data from local HWA (e.g. GPU RAM) cache on spoolers 26  430

Buffering data from remote (e.g. CPU) cache on spoolers 26  440

Optionally managing a queue of buffered chunks of data, to rearrange it according to predefined criteria  450

Propagating the buffered data to the target HWA unit input, while maintaining a maximal constant data input bandwidth.  460

Figure 4

METHOD FOR EXECUTING QUERIES ON DATA CHUNKS USING GRAPHIC PROCESSING UNITS

BACKGROUND

Hardware accelerators account for an ever increasing share of computing power in complex computational systems. The compound design of such modern systems, incorporating multiple accelerators, each custom built to fit a specific functionality proves to be an efficient alternative to serial task managing by a central processing unit.

With the improvement in processing speed, the bottleneck in data throughput has shifted from actual data processing to the acquisition of input data. When the rate of data input is non-optimal, the hardware accelerator data throughput and productivity drops exponentially.

TECHNICAL FIELD

The present invention generally relates to the field of parallel data processing, and specifically to the field of data flow optimization in hardware accelerators.

BRIEF SUMMARY

1. The present invention discloses a method for optimizing the throughput of hardware accelerators (HWAs) in a computerized abstraction system, by utilizing the maximal data input bandwidth to the said HWAs, method comprising the step of:
   dynamically obtaining the quantities and properties of HWAs and storage units within the computerized abstraction system
   dynamically allocating cache memory space per each of the HWAs, according to the said obtained quantities and properties, to minimize the time required for reading data from storage instances to the said HWA
   dynamically allocating spoolers per each of the HWAs, according to the said obtained quantities and properties, to buffer the input data and ensure a continuous flow of input data, in the target HWA's maximal input bandwidth.
2. The method of example 1, wherein the said cache memory space is divided between a local memory instance and a remote memory instance, thus forming a hierarchical cache scheme.
3. The method of example 1, wherein the spoolers form a data queue at the HWA's input, thus enabling the management of queued input data, for improving the data input rate.
4. The method of example 1, wherein:
   the HWA can directly retrieve data from adjacent HWAs or storage modules in the said computerized abstraction system, without consuming resources from a common data bus or processor, and
   the said retrieved data is cached by the said cache memory, to minimize the time required for reading data from the said adjacent HWAs or storage modules to the target HWA, and
   the said retrieved data is buffered by the said data spoolers to ensure a continuous flow of input data in the target HWA's maximal input bandwidth.
5. The present invention further discloses a computerized abstraction system for optimizing the throughput of hardware accelerators (HWAs), by maintaining a maximal rate of data transfer from storage units to the said HWAs, said system comprised of:
   a File-System for storing and managing access to data on a plurality of storage modules in the computerized abstraction system's environment
   a memory cache space, allocated per each of the HWAs, to minimize the time required for reading data from storage instances to target HWAs;
   spoolers allocated per each of the HWAs, to buffer the input data, and ensure a continuous flow of input data in the target HWA's maximal input bandwidth.
   an Opaque File System module that:
      optimally allocates the said memory cache space, to cache the input data, and minimize the time required for reading data from storage modules to target HWAs, and
      optimally allocate the said spoolers to buffer the input data and ensure a continuous flow of input data, in the target HWA's maximal input bandwidth
   wherein the allocation of said memory cache space and said spoolers is adapted dynamically according to the current quantities and properties of HWA and storage instances within the computerized system.
6. The system of example 5, wherein the said cache memory space is divided between a local memory instance and a remote memory instance, thus forming a hierarchical cache scheme.
7. The system of example 5, wherein the said spoolers form a data queue at the HWA's input, thus enabling the management of queued input data, to improve the data input rate.
8. The system of example 5, further comprising a direct memory access module, enabling the HWAs to directly retrieve data from adjacent HWAs or storage modules within the said computerized abstraction system, without consuming resources from a common data bus or processor, wherein
   the said retrieved data is cached by the said cache memory, to minimize the time required for reading data from the said adjacent HWAs or storage modules to the target HWA, and
   the said retrieved data is buffered by the said data spoolers to ensure a continuous flow of input data in the target HWA's maximal input bandwidth.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIG. 2 depicts a flow diagram elaborating the functionality of the Opaque File System (OFS), according to some embodiments of the present invention.

FIG. 4 is a flow diagram, depicting the function of the Hardware Accelerator Reader (HWAR) module, according to some embodiments of the invention.

DETAILED DESCRIPTION

Figure 1:
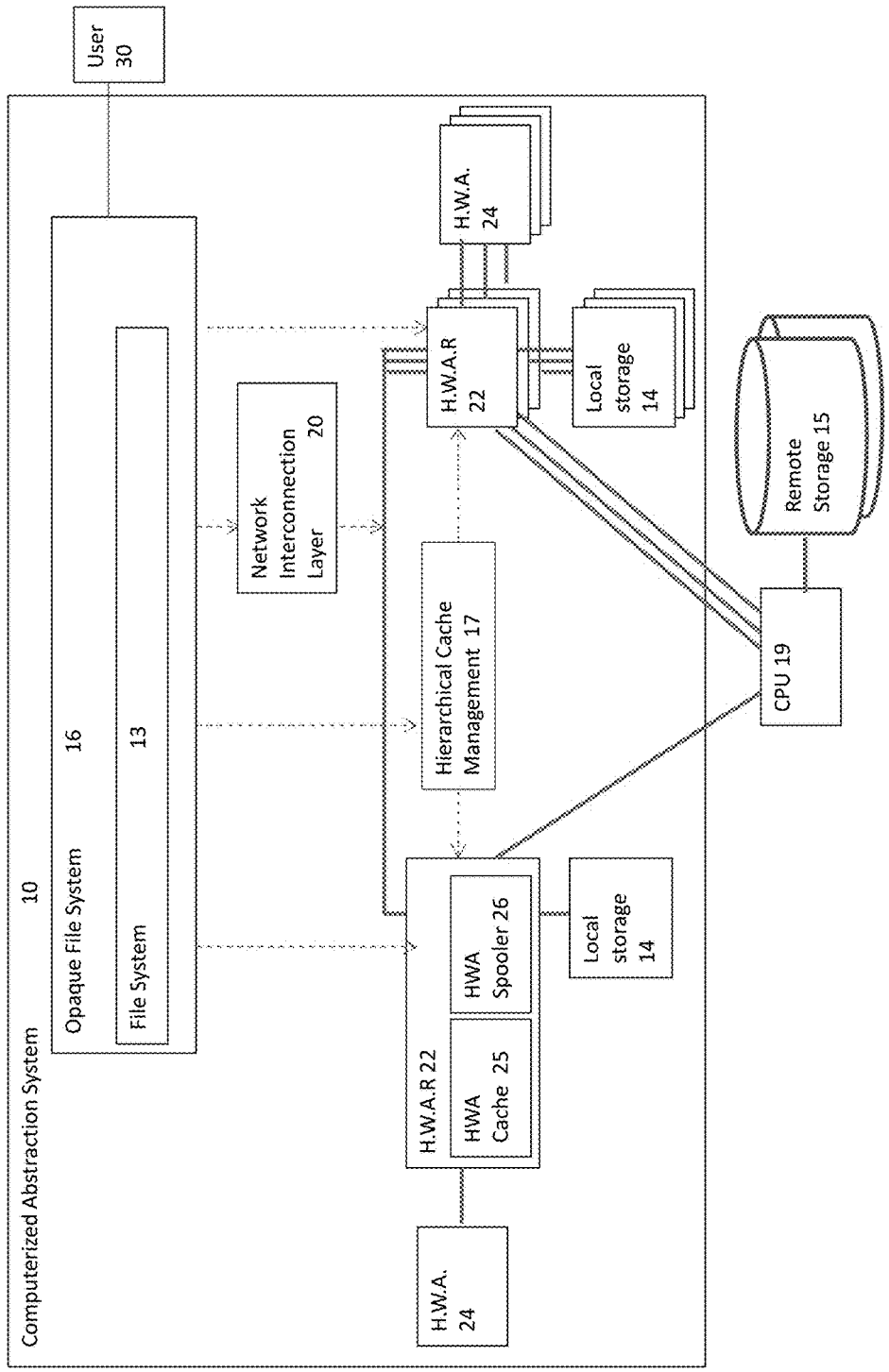
FIG. 1 depicts a block diagram, presenting the different modules incorporated in the Abstraction system 10 according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| File System | The term "File System" (FS) as it is used throughout this document refers to any type of File System that controls the storage and retrieval of data from various media. |
| Opaque File System | The Opaque File System (OFS) is a managing mechanism which envelops the File System, controls the function of Hardware Accelerator readers (HWARs), and assigns HWAR resources to specific Hardware Accelerators (HWA) |
| Network Interconnection Layer | The Network Interconnection Layer (NIL) is a logical module which is controlled by the Opaque File System (OFS), and supervises the direct transfer of data among different HWAs. The function of this module resembles that of a DMA in computational systems, and may be realized by a variety of commercially available solutions, such as GPUDirect. |
| Hardware Accelerator (HWA) | The term Hardware Accelerator (HWA) as it is used throughout this document refers to any kind of dedicated Hardware, normally performing computationally intensive operations. Examples for such HWA modules are GPUs, DSPs, Network adaptors etc. |
| Hardware Accelerator Reader (HWAR) | Hardware Accelerator Readers (HWARs) are modules that supervise the flow of data into respective HWA modules, in an effort to keep the HWA data-reading at a maximal bandwidth, and optimize the HWA data throughput. The HWARs incorporate data Spoolers that facilitate data buffering and optionally data queuing in the HWA input. The HWARs incorporate a cache layer to reduce the read time of data (e.g. from a physical disk) to the target HWA. The HWAR's caching mechanism is based on the Hierarchical Cache concept, wherein cached memory is divided between "Local cache", implemented on Local Storage Media (LSM) and "Parent cache" implemented on Remote Storage Media (RSM). The HWARs are directly controlled by the Hierarchical Cache Management (HCM) module, which in turn is managed by the Opaque File System (OFS). |
| Spooler | In the context of this document, the term 'Spooler' describes a module residing within the HWAR, which implements the functionality of HWA input-data buffering. The spoolers feed the HWA with a continuous stream of data input, in the HWA's maximal input bandwidth, thus optimizing the HWA's throughput. According to some embodiments, the spooler may also implement the functionality of queuing on the HWA's input data. |
| Hierarchical Cache Management (HCM) | The Hierarchical Cache Management module supervises the implementation of the Hierarchical Cache access policy, as implemented by the Hardware Accelerator Readers (HWARs) It assigns HWAR resources to accommodate the requirements of specific HWAs, in an effort to optimize the HWAs' data input rate. |
| Local Storage Media and Remote Storage Media | The terms Local Storage Media (LSM) and Remote Storage Media (RSM) respectively refer to memory storage media that are local or remote in respect to a HWA in question. For example, the LSM may be manifested by a local GPU RAM memory, and the RSM may be manifested by a remote disk drive, reachable via CPU access. |
| Computerized Abstraction system | In the context of the current document, the term "Computerized Abstraction System" or "Abstraction System" describes a computerized environment that includes at least: one HWA module, one data storage module, a File-System an OFS module an HWAR module, which is configured by the OFS module to optimize the HWA module's data input rate |
| Computerized Abstraction | The properties of each Computerized Abstraction System component are of course component-specific. In the context of |

| Term | Definition |
| --- | --- |
| System components properties | this document we refer to properties that affect the OFS algorithm of HWAR resource allocation. Examples for such properties are the type of an HWA (e.g. a Network adapter) and its capacity (e.g. 100 MB bandwidth). These properties affect the allocation of spoolers (buffers, queues) and cache memory by the HWARs. |

The present invention describes an abstraction and management system, designed to envelop any type of a computerized File-System (FS). The abstraction system dynamically allocates resources to support the function of a plurality of Hardware Accelerators (HWAs), and maximize the HWAs' throughput by constantly securing a maximal flow of input data to the HWAs.

FIG. 1 depicts a block diagram, presenting the different modules incorporated in the Computerized Abstraction System 10 according to some embodiments of the invention.

The File System 13 (FS) block presents any type of a commercially available File System that controls the storage and access of data from various media.

The Opaque File System 16 (OFS) envelops the File System 13, and enhances the File system's data access capabilities;

It follows the dynamically changing quantities and properties of Abstraction System 10 components (e.g. Addition and omission of HWAs and storage modules)

The Opaque File System 16 allocates HWAR 22 resources to specific HWAs 24 according to the said changing quantities and properties of Abstraction System 10 components. For example, the Opaque File System 16 may:

Add HWAR 22 instances

Add spoolers within the HWAR 22 instances.

Add cache memory space within the HWAR 22 instances.

Divide the said cache memory space between local and remote memory instances

It supervises the functionality of the Network Interconnection Layer (NIL, 20), which facilitates direct memory access of any of the HWAs 24 to designated storage media, without consuming computational resources from a common data bus or microprocessor.

It implements a preconfigured policy of storage resource redundancy, to enable data recovery in the case of memory system failure.

The plurality of Hardware Accelerator modules (HWA, 24) refers to any kind of dedicated hardware in the Abstraction System's environment 10, normally performing computationally intensive operations. Examples for such HWA 24 modules are GPUs, DSPs, Network adaptors etc.

The Hardware Accelerator Readers (HWARs, 22) supervise the flow of data into respective HWA 24 modules, in an effort to keep the HWA data-input at a maximal bandwidth, and optimize the HWA 24 data throughput.

The HWARs 22 incorporate at least one data spooler 26, which implements the functionality of data buffering on the HWA 24 input. The spoolers are designed to maintain a constant stream of data input, in the HWA's maximal input bandwidth, and thus optimize the HWA's throughput.

According to some embodiments, the spoolers 26 further implement the function of data queuing, thus further enhancing the manageability of the HWA's input data stream.

The HWARs 22 further incorporate a HWA-specific cache layer 25, which is designed to minimize data fetch time, and thus keep the target hardware accelerator at its maximal data input rate.

According to some embodiments, the HWAR's 22 caching mechanism is based on the Hierarchical Cache concept, wherein cached memory is divided between a local memory instance (HWA cache 25) resident on the HWAR 22, and a "Parent cache" implemented on a remote memory instance. For example, the HWA cache 25 may be implemented on a GPU RAM, and the "Parent cache" memory instance may be implemented on a CPU RAM.

The HWAR 22 cache layer 25 is directly controlled by the Hierarchical Cache Management (HCM) Module.

The Hierarchical Cache Management (HCM, 17) module supervises the implementation of the Hierarchical Cache access policy, in an effort to optimize the HWA 24 data input rate:

It dynamically allocates Local HWA cache 25 memory to accommodate the caching requirements of specific HWAs 24.

It determines the partition of cache memory between a local memory instance (e.g. GPU RAM) and a remote memory instance (e.g. CPU RAM).

The function of the HCM 17 is configured by the Opaque File System 16.

The Network Interconnection Layer (NIL, 20) is a logical module which supervises the direct transfer of data among different HWA 24 modules, via their respective HWARs 22. The function of this module resembles that of a DMA in computational systems, and may be realized by a variety of commercially available solutions, such as GPUDirect.

The NIL's (20) is configured by the Opaque File System (OFS) 16.

FIG. 2 depicts a flow diagram elaborating the functionality of the Opaque File System (OFS, 16), according to some embodiments of the present invention.

The OFS 16 follows the dynamically changing quantities and properties of Abstraction System 10 components (step 210). This includes all the information regarding:

Hardware Accelerators 24 (e.g. GPUs, Network Adapters etc.)

Hardware Accelerator Readers (HWAR, 22)

Local Storage 14 units,

Remote Storage 15 units and respective CPUs 19 or other controllers

The Network Interconnection Layer 20

The OFS 16 treats all memory media mounting points as one logical scalable partition at the application level (step 220).

According to some embodiments of the present invention, the OFS 16 implements a configurable policy of storage resource redundancy. It thus maintains a recovery mechanism in case of system failure (step 230).

The OFS 16 allocates HWAR 22 resources according to the dynamically changing quantities and properties of the Abstraction System's 10 components, in an effort to maximize the HWAs' data input rate, and ensure optimal HWA throughput (step 240). The said resources include at least one of the following:
- Number of HWARs
- Number of spoolers 26, and their buffer size
- Local memory space 14
- Access to the Network Interconnection Layer 20

According to the dynamically changing quantities and properties of the Abstraction System's 10 components, the OFS 16 module configures the Hierarchical Cache Management (HCM, 17) module, to implement a cache policy on the HWARs. This policy serves to cache HWA 24 input data, in order to minimize data-read time, maximize the HWAs' data input rate, and maintain high HWA 24 throughput (step 250). The Hierarchical Cache policy configuration includes:
- Allocating HWA Cache 25 memory space
- Optionally dividing the cache memory space between a local memory instance (e.g. GPU RAM) and a remote memory instance (e.g. CPU 19 RAM), thus forming a hierarchical cache scheme.

The OFS 16 configures the Network Interconnection Layer (NIL, 20) module according to the dynamically changing quantities and properties of Abstraction System 10 components. The NIL 20 module facilitates direct access of any of the HWARs 22 to designated storage media (step 260).

Figure 3:
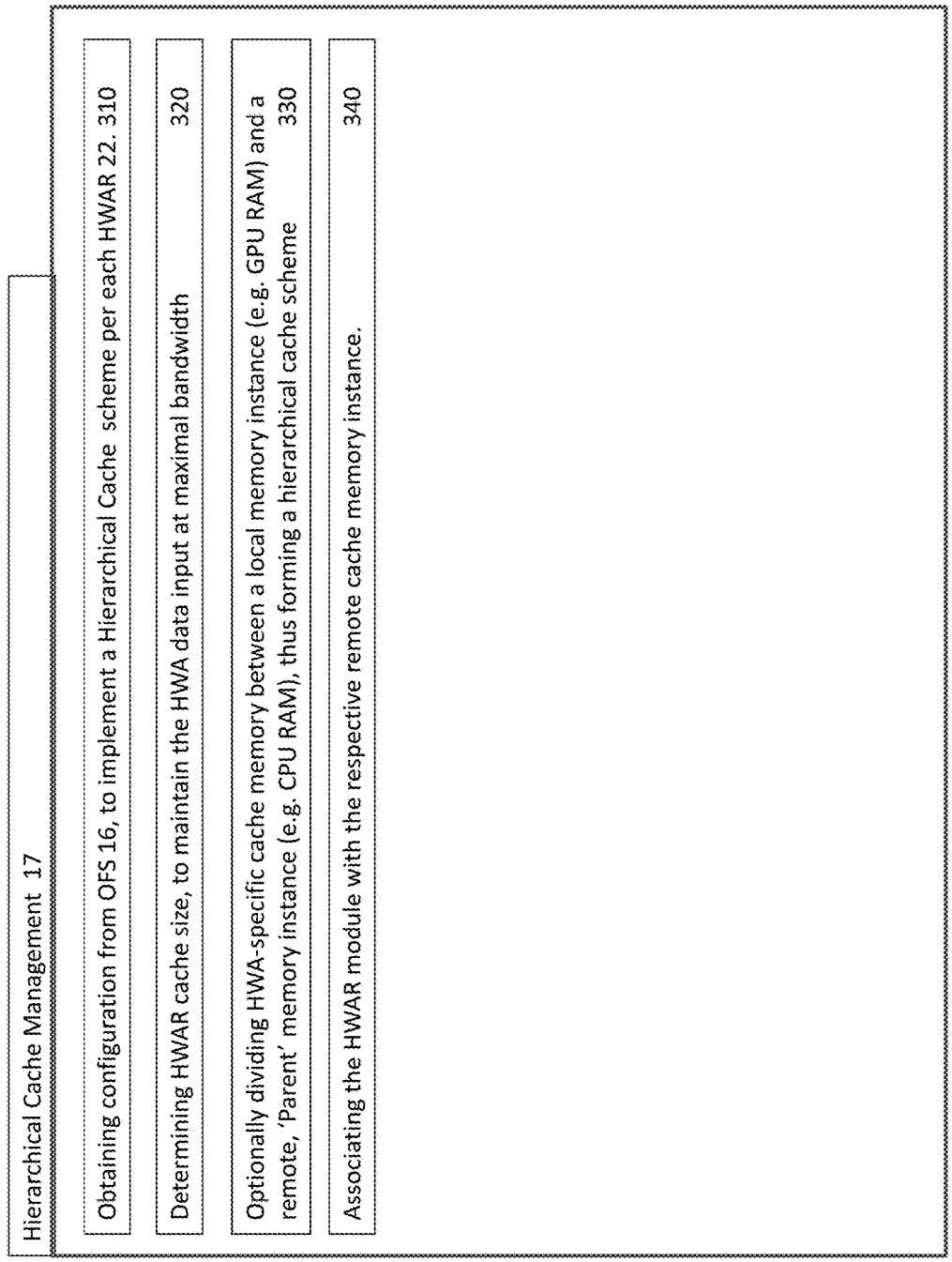
FIG. 3 is a flow diagram of the Hierarchical Cache Management (HCM) module, according to some embodiments of the invention.

FIG. 3 is a flow diagram of the Hierarchical Cache Management (HCM, 17) module, according to some embodiments of the invention.
- The HCM 17 obtains its configuration from the OFS module (step 310).
- The HCM 17 determines the HWA cache 25 size, to maintain the HWA data input at maximal bandwidth (step 320).
- According to some embodiments, the HCM 17 divides HWA-specific cache memory between a local memory instance 25 (e.g. GPU RAM) and a remote, 'Parent' memory instance (e.g. CPU 19 RAM) (step 330), thus forming a hierarchical cache scheme.
- The HCM 17 Associates the HWAR module with the respective Local cache memory instance (e.g. HWA RAM) and remote cache memory instance (e.g. CPU RAM) (step 340).

FIG. 4 is a flow diagram, depicting the function of the Hardware Accelerator Reader (HWAR, 22) module, according to some embodiments of the invention.
- The HWAR 22 receives chunks of data from local storage 14 and remote storage 15 modules, en route the HWA 24 module. It buffers the said data chunks on spoolers 26.
- The HWAR 22 receives chunks of data over the Network Interconnection Layer 20, en route the HWA 24 module. It buffers the said data chunks on spoolers 26.
- The HWAR 22 buffers chunks of data from the local HWA cache 25 on spoolers 26.
- The HWAR 22 buffers chunks of data from the remote (e.g. CPU 19 RAM) cache (step 440) on spoolers 26.
- According to some embodiments of the present invention, the HWAR 22 manages a queue of buffered chunks of data on the spooler 26 (step 450). This enables the HWAR 22 to rearrange the input data according to predefined criteria, such as:
  - Priority of tasks
  - Rearrangement of received data packets according to their packet number
  - Omitting received redundant data
- The HWAR 22 propagates the buffered data to the target HWA 24 unit input, while maintaining a maximal, constant data input bandwidth (step 460).

Figure 5:
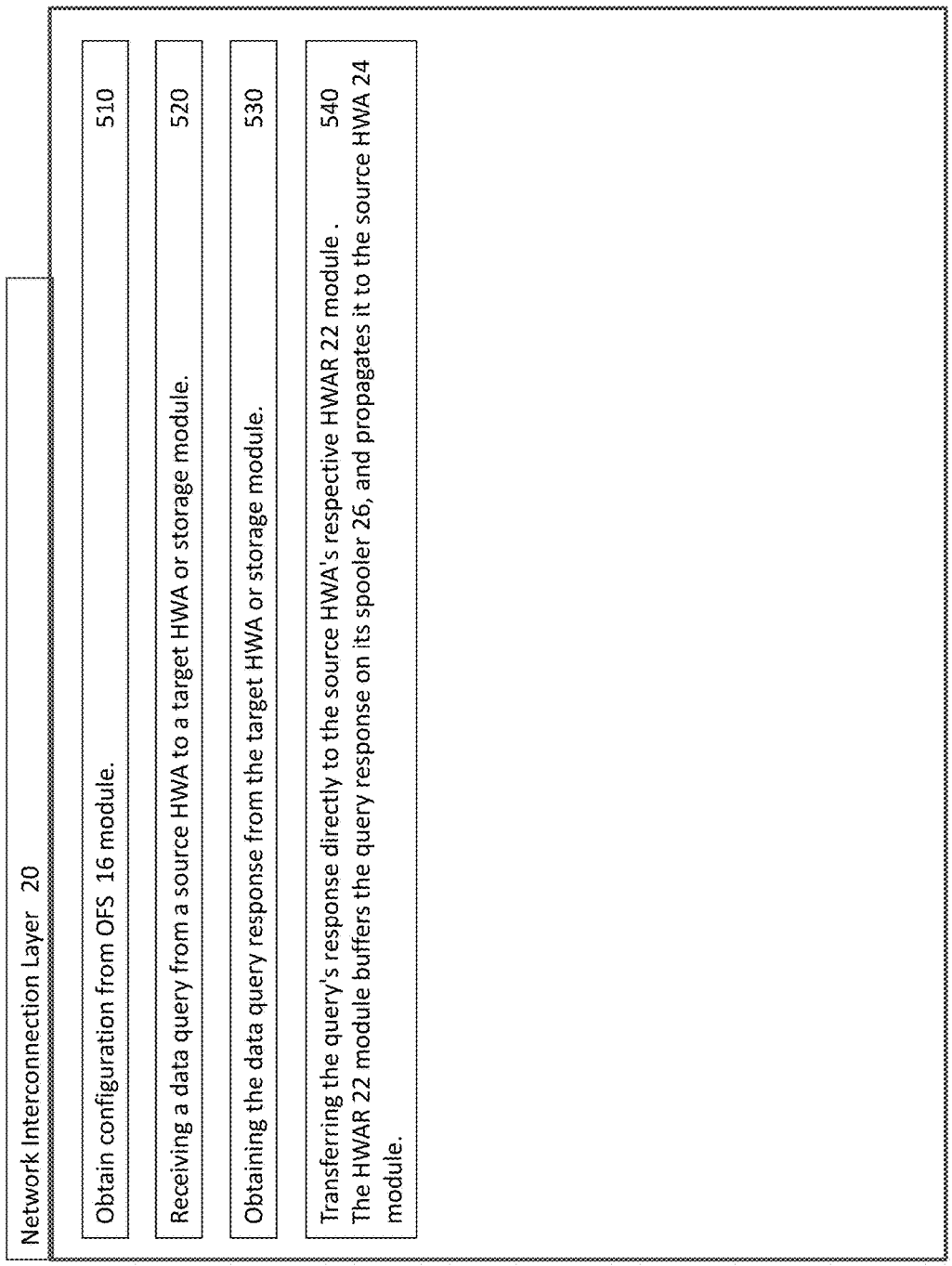
FIG. 5 is a flow diagram, depicting the function of the Network Interconnection Layer (NIL) module, according to some embodiments of the invention.

FIG. 5 is a flow diagram, depicting the function of the Network Interconnection Layer (NIL, 20) module, according to some embodiments of the invention.
- The NIL 20 module obtains its configuration from the OFS module (step 510).
- The NIL 20 receives a data query from a source HWA 24 to a target HWA 24 or to a local storage module 14 (step 520).
- The NIL 20 obtains the data query response from the target HWA 24 or storage module 14 (step 530).
- The NIL 20 transfers the query's response directly to the source HWA's respective HWAR 22 module (step 540). The HWAR 22 module buffers the query response on its spooler 26, and propagates it to the source HWA 24 module.

Figure 6:
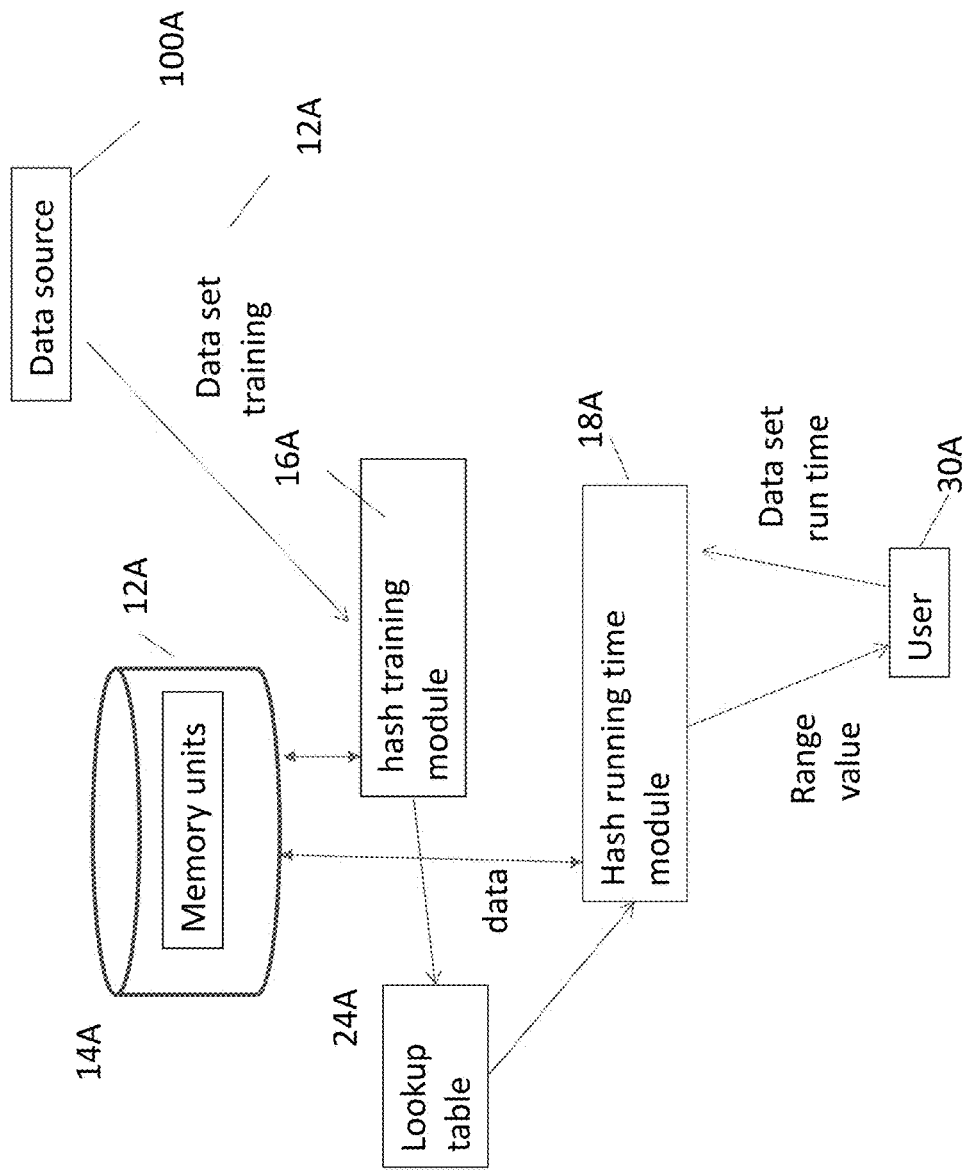
FIG. 6 illustrates a block diagram showing the entities and modules involved in hash training and management models, according to some embodiments of the invention.

FIG. 6 illustrates a block diagram showing the entities and modules involved in hash training and management models, according to some embodiments of the invention. Data set training 12A are received for data source 100A to hash training module 16A. At the training module, the training data is mapped into look table 24A using a preserve hash function. The hash running module 18A provide the user 30A with range value based on the updated lookup table for a given runtime data set provided by the user 30A.

Figure 7:
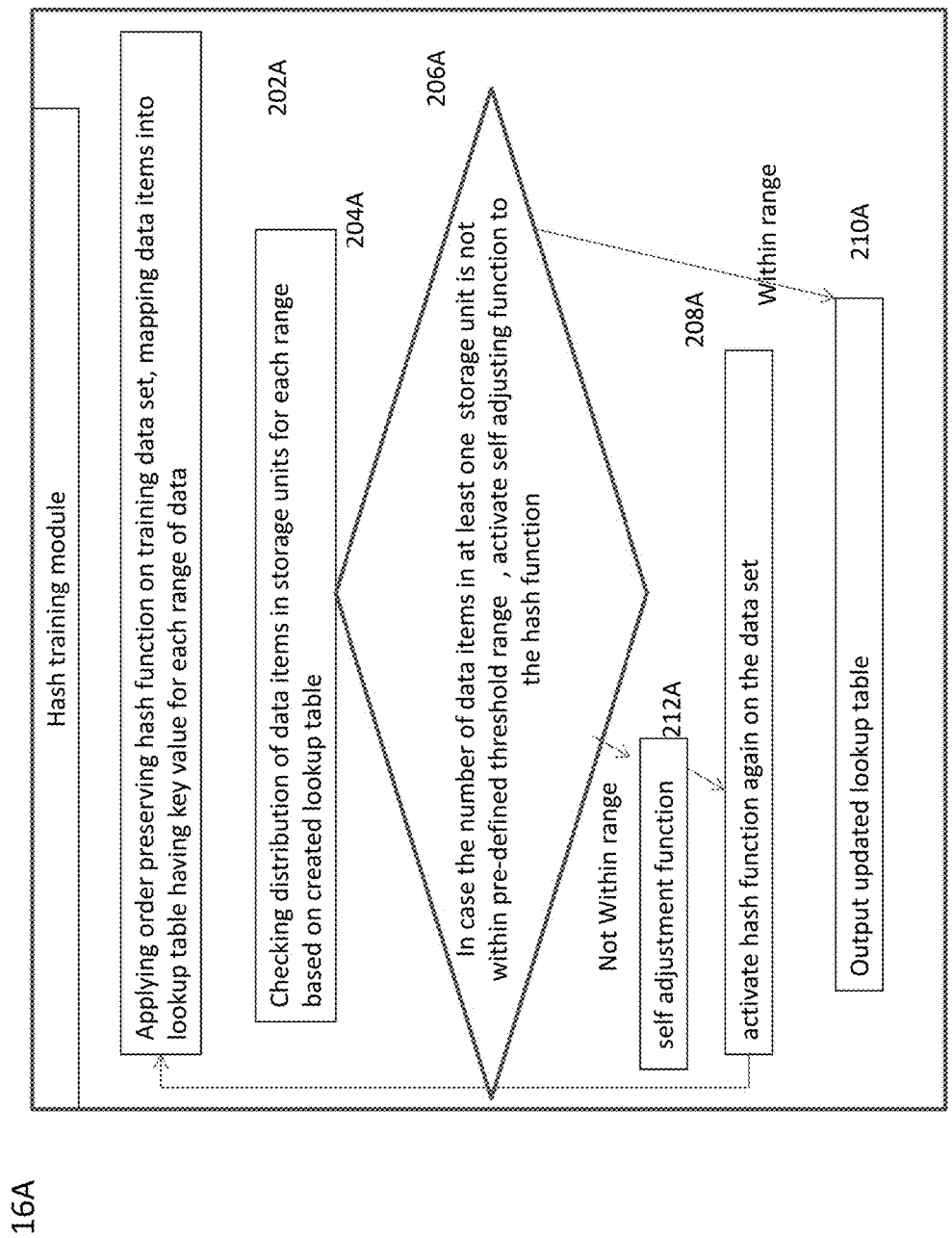
FIG. 7 is a flow diagram of the Hash training module for processing module, processing according to some embodiments of the invention.

FIG. 7 is a flow diagram of the Hash training module for processing module, processing according to some embodiments of the invention. The hash training module apply at least one of the following steps: Applying order preserving hash function on training data set and mapping data items into lookup table having key value for each range of data (step 202A), checking distribution of data items in storage units for each range, based on created lookup table (step 204A). In case the number of data items in at least one storage unit is not within pre-defined threshold range (step 206A), activate self adjusting function to the hash function (step 212A) and activate adjusted hash function again on the data set step (step 208). If at least all storage unit are within pre-defined threshold range, output updated lookup table (step 210). The adjusted hash function is changing hash function parameter to be associated to the identified key value/memory unit.

Figure 8:
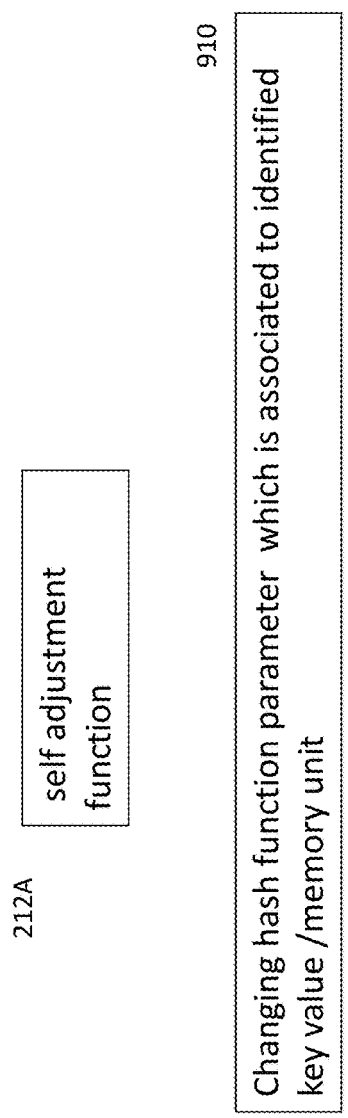
FIG. 8 is a flow diagram of the self adjustment function, processing according to some embodiments of the invention.

FIG. 8 is a flow diagram of the self adjustment function, processing according to some embodiments of the invention. The self adjustment function, enable changing hash function parameter which is associated to key value/storage unit which is was identified having number of data items not within the pre-defined threshold range (9210).

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for optimizing the throughput of hardware accelerators (HWAs), by maintaining a maximal rate of data transfer from storage units to the said HWAs, said method comprising the steps of:
    storing and managing, by a File-System, access to data on a plurality of storage modules in the computerized abstraction system's environment;
    allocating a memory cache space, per each of the HWAs, to minimize the time required for reading data from storage instances to target HWAs;
    allocating spoolers, per each of the HWAs, to buffer the input data, and ensure a continuous flow of input data in the target HWA's maximal input bandwidth;
    wherein the said memory cache space is optimally allocated, by an Opaque File System, to cache the input data, and minimize the time required for reading data from storage modules to target HWAs;
    wherein the said spoolers are optimally allocated, by the Opaque File System, to buffer the input data and ensure a continuous flow of input data, in the target HWA's maximal input bandwidth; and
    wherein the allocation of said memory cache space and said spoolers is adapted dynamically according to the current quantities and properties of HWA and storage instances within the computerized system.

2. The method of claim 1, wherein the said cache memory space is divided between a local memory instance and a remote memory instance, thus forming a hierarchical cache scheme.

3. The method of claim 1, wherein the spoolers form a data queue at the HWA's input, thus enabling the management of queued input data, for improving the data input rate.

4. The method of claim 1, wherein:
    the HWA can directly retrieve data from adjacent HWAs or storage modules in the said computerized abstraction system, without consuming resources from a common data bus or processor, and
    the said retrieved data is cached by the said cache memory, to minimize the time required for reading data from the said adjacent HWAs or storage modules to the target HWA, and
    the said retrieved data is buffered by the said data spoolers to ensure a continuous flow of input data in the target HWA's maximal input bandwidth.

5. A computerized abstraction system for optimizing the throughput of hardware accelerators (HWAs), by maintaining a maximal rate of data transfer from storage units to the said HWAs, said system comprised of:
    a File-System for storing and managing access to data on a plurality of storage modules in the computerized abstraction systems environment
    a memory cache space, allocated per each of the HWAs, to minimize the time required for reading data from storage instances to target HWAs;
    spoolers allocated per each of the HWAs, to buffer the input data, and ensure a continuous flow of input data in the target HWA's maximal input bandwidth;
    an Opaque File System module that:
        optimally allocates the said memory cache space, to cache the input data, and minimize the time required for reading data from storage modules to target HWAs, and
        optimally allocate the said spoolers to buffer the input data and ensure a continuous flow of input data, in the target HWA's maximal input bandwidth
    wherein the allocation of said memory cache space and said spoolers is adapted dynamically according to the current quantities and properties of HWA and storage instances within the computerized system.

6. The system of claim 5, wherein the said cache memory space is divided between a local memory instance and a remote memory instance, thus forming a hierarchical cache scheme.

7. The system of claim 5, wherein the said spoolers form a data queue at the HWA's input, thus enabling the management of queued input data, to improve the data input rate.

8. The system of claim 5, further comprising a direct memory access module, enabling the HWAs to directly retrieve data from adjacent HWAs or storage modules within the said computerized abstraction system, without consuming resources from a common data bus or processor, wherein
    the said retrieved data is cached by the said cache memory, to minimize the time required for reading data from the said adjacent HWAs or storage modules to the target HWA, and
    the said retrieved data is buffered by the said data spoolers to ensure a continuous flow of input data in the target HWA's maximal input bandwidth.

* * * * *